United States Patent [19]

Mizuno

[11] 4,093,050
[45] June 6, 1978

[54] CLUTCH AND ACCELERATOR CONTROLLED BRAKE LOCK FOR VEHICLES

[75] Inventor: Akira Mizuno, Kariya, Japan

[73] Assignee: Goshi Kaisha Mizuno Kogeisha, Japan

[21] Appl. No.: 669,752

[22] Filed: Mar. 24, 1976

[30] Foreign Application Priority Data

Mar. 27, 1975 Japan .................................. 50-37361

[51] Int. Cl.² ...................... F16D 67/04; B60T 11/10
[52] U.S. Cl. .................................. 192/0.049; 188/265; 192/3 TR; 192/13 A
[58] Field of Search ............. 192/0.048, 0.049, 3 TR, 192/13 A, 3 T; 188/265

[56] References Cited

U.S. PATENT DOCUMENTS

| | | | |
|---|---|---|---|
| 1,976,471 | 10/1934 | Adams | 188/265 X |
| 3,322,246 | 5/1967 | Noguchi | 192/0.049 |
| 3,426,872 | 2/1969 | Irie et al. | 192/3 TR |
| 3,434,575 | 3/1969 | Mizuno | 192/3 TR |
| 3,439,782 | 4/1969 | Uda et al. | 192/3 TR |
| 3,498,426 | 3/1970 | Nakano | 192/13 A |

Primary Examiner—Benjamin W. Wyche
Attorney, Agent, or Firm—Craig & Antonelli

[57] ABSTRACT

A control device for a braking system of a vehicle including a stationary ferromagnetic plate, a lever pivotally mounted on the plate and operationally connected to a brake pedal to rotate in accordance with the movement of the brake pedal, an electromagnet mounted on the lever and electrical control circuit for the electromagnet whereby when energized the electromagnet is fixed on the plate by attractive force so that the brake pedal is retained at the position. An electric coil of the electromagnet is connected in series to a circuit including in parallel a first switch associated to an accelerator pedal and a second switch associated to a clutch pedal so that the electromagnet is deenergized when both accelerator pedal and clutch pedal are actuated, thereby releasing the brake.

6 Claims, 9 Drawing Figures

CLUTCH AND ACCELERATOR CONTROLLED BRAKE LOCK FOR VEHICLES

The present invention relates to a braking system of a vehicle and more particularly to a control device therefor.

In order to facilitate the operation of an automobile, there has been proposed a control device of a brake system of such an arrangement that, when a running vehicle is stopped by depressing a brake pedal to apply braking, the brake is retained to be effective, until the accelerator pedal is depressed thereafter. However, the prior control device of brake system is not satisfactory in safety, because in case in which an automobile having the prior control device and a manual transmission gear device is stopped with its brake retained to be effective, if the accelerator pedal is depressed by mistake without actuating the clutch pedal, the retaining of the brake will be automatically released and then the automobile unguardedly advances to collide with a preceding vehicle from behind, thus resulting in an unexpected serious accident.

An object of the present invention is to provide a novel control device for a braking system of a vehicle wherein the retaining of the brake is released only when both accelerator pedal and clutch pedal are simultaneously actuated.

According to the present invention, there is provided a control device for a braking system of a vehicle comprising means for retaining a brake in braking condition and electrical control means for said retaining means, said electrical control means including means for energizing said retaining means upon stopping of the vehicle, first switch means adapted to be actuated when an accelerator pedal is depressed beyond a predetermined extent, second switch means adapted to be actuated when a clutch pedal is depressed to a predetermined position and circuit means for deenergizing said retaining means when both of said first and second switch means are actuated.

The drawings show embodiments of the present invention, in which.

Figure 1:
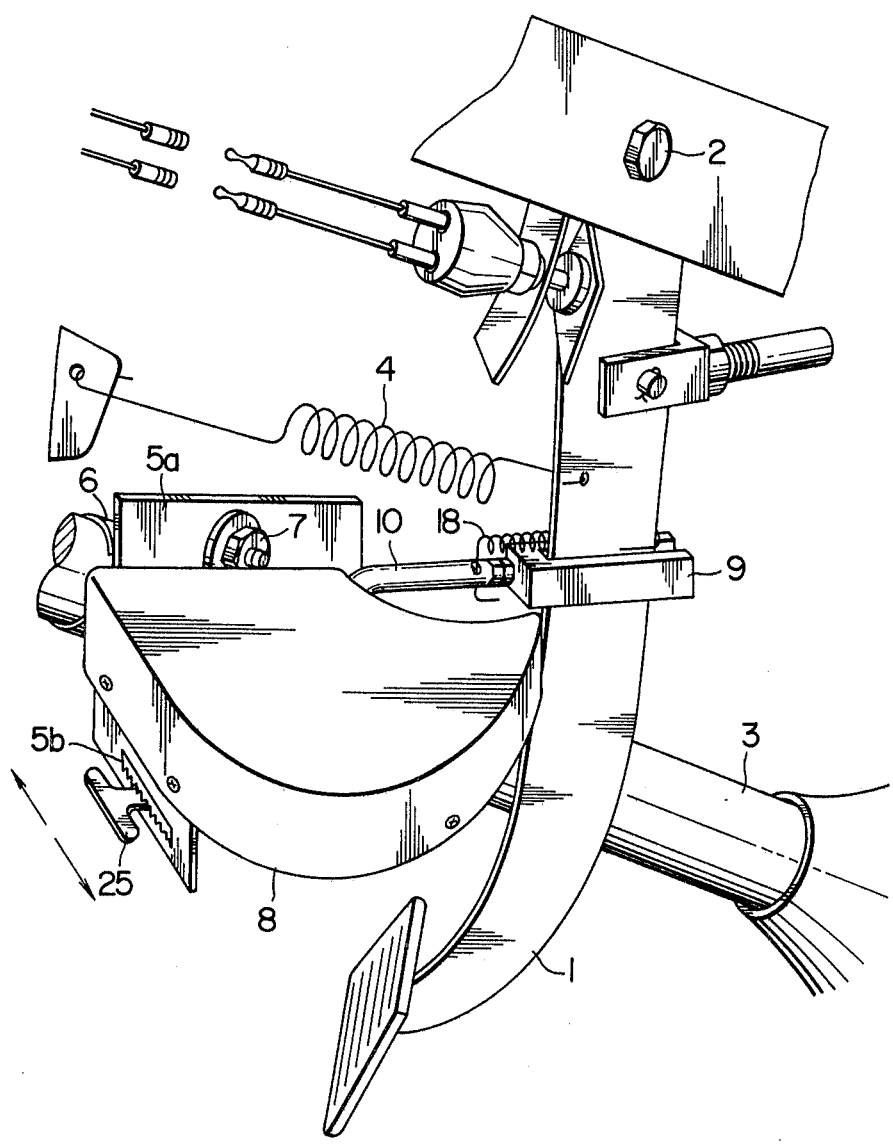
FIG. 1 is perspective view showing an essential portion of an embodiment in the vicinity of a brake pedal.

Description will hereunder be given of the embodiments shown in the drawings.

Figure 2:
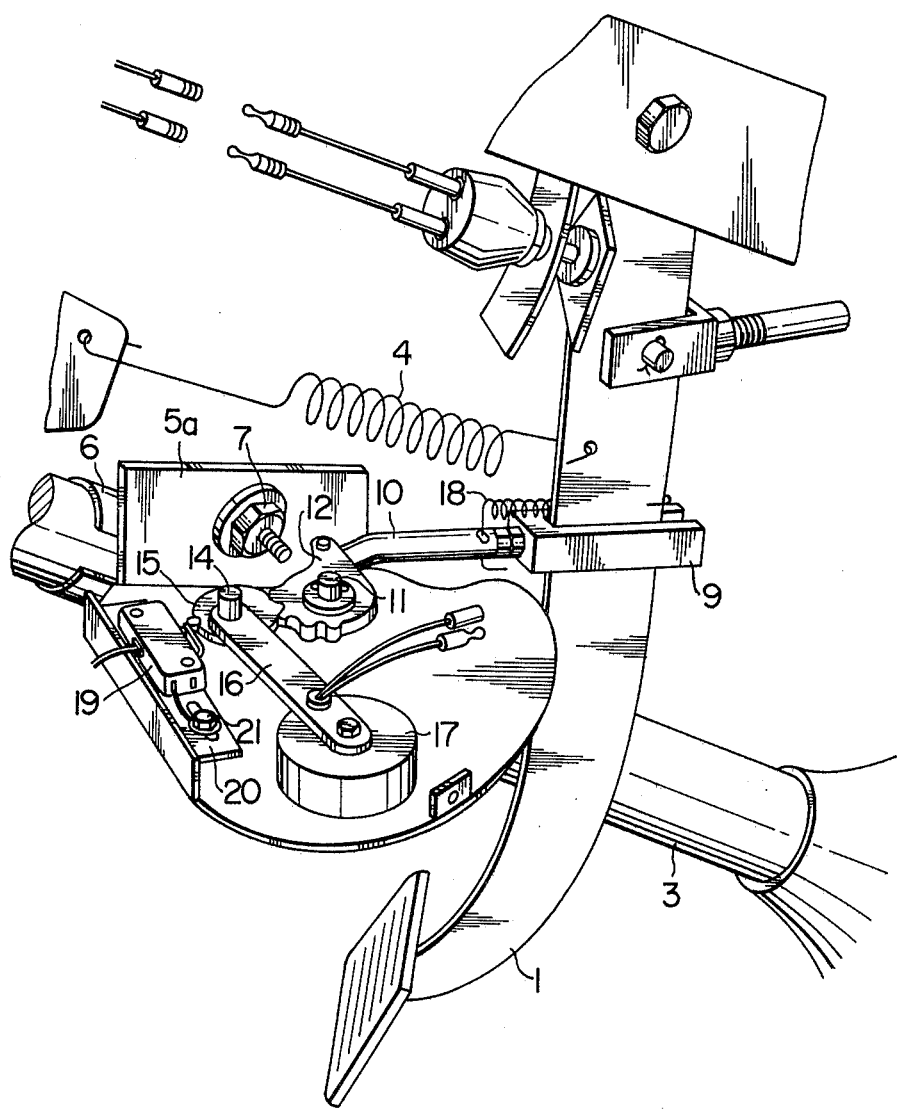
FIG. 2 is a perspective view of the essential portion with a cover 8 removed.
Figure 3:
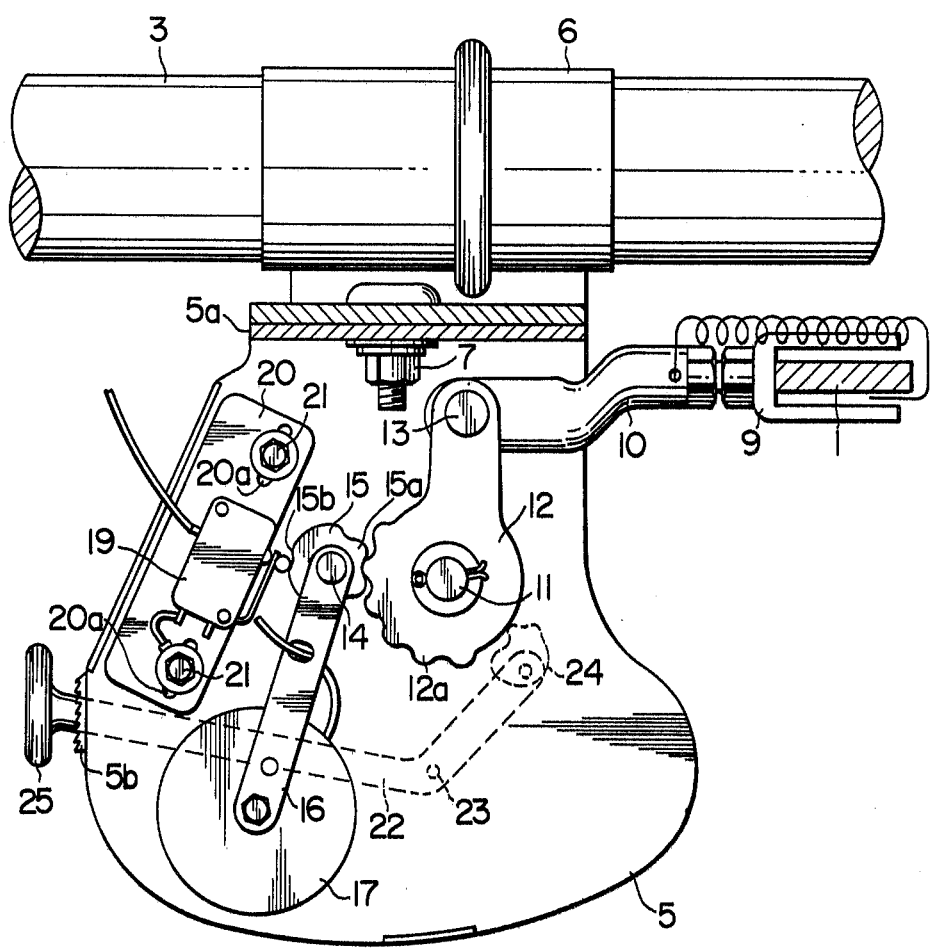
FIG. 3 is a view of the essential portion with the cover 8 removed, as viewed from the direction perpendicular to an attracting plate.
Figure 4:
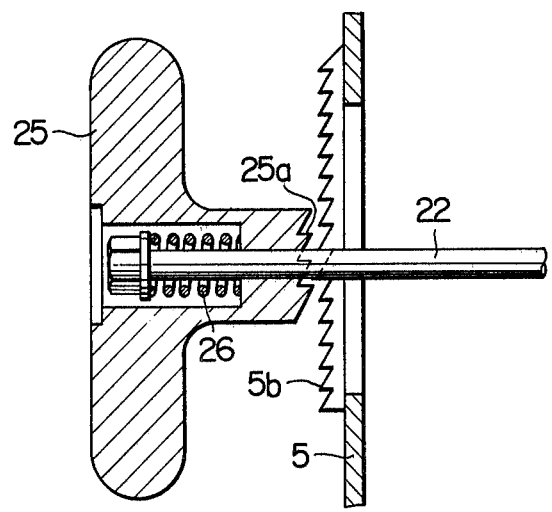
FIG. 4 is a sectional view of a manual locking handle.

In FIG. 1 through FIG. 3, designated at 1 is a brake pedal pivotally movable about a bolt 2, 3 a handle post, 4 a spring for restoring the brake pedal, and 5 an attracting plate made of a ferromagnetic material formed into a generally flat plate with one outer peripheral portion being bent to form a bent portion 5a which is fastened to a mounting fitting 6 which, in turn, is fastened to the handle post 3. Thus the attracting plate is supported stationarily by a chassis of the vehicle. 7 is a bolt and a nut for fastening the attracting plate to the mounting fitting 6. 8 is a cover removably coupled to another bent portion of the attracting plate 5. FIG. 2 and FIG. 3 show the state in which the cover is removed. 9 is a fork-like connecting member whose forked portion is coupled on to the brake pedal 1 as shown in the drawing and whose base portion is fastened to one end of a rod 10 by means of a screw. The other end of the rod 10 is connected through a pin 13 to a pivotal member 12 loosely coupled to a shaft 11 erected on the attracting plate 5. Notched around the outer periphery of the pivotal member 12 are teeth 12a engaging with teeth 15a of another pivotal member 15 loosely coupled to a shaft 14 erected on the attracting plate 5. The teeth 15a are provided on a portion of the outer periphery of the pivotal member 15 which is provided with a cam portion 15b at a portion where no teeth 15a are notched. 16 is a metal lever or arm fastened at one end to the pivotal member 15 and fitted at the other end with an electromagnet 17 whose attracting surface is disposed in opposite relationship with a surface of the attracting plate 5. 18 is a spring for constantly urging the connecting member 9 against the brake pedal 1. The rod 10, together with pivotal members 12 and 15, serves to interconnect the lever 16 and the brake pedal 1, so that movement of the brake pedal 1 is transmitted to the lever 16, thereby pivotally moving the lever 16 about the shaft 14. During the pivotal movement of the lever 16, the electromagnet 17, supported by the lever 16, moves along the surface of the attracting plate. Fixed on a mounting plate 20 is a microswitch 19 whose actuater engages with the cam portion 15b of the pivotal member 15 so that the microswitch 19 is actuated to be open or close in accordance with the turning of the pivotal member 15. The mounting plate 20 is provided therein with a slot 20a through which the mounting plate 20 is mounted on one surface of the attracting plate 5 by means of a bolt 21, and the mounting plate 20 can be adjusted in its position within the limit of the length of the slot 20a. 22 is a manual locking lever pivotally mounted about a pin 23 erected on the attracting plate, and provided at an end with a catch claw 24 and at the other end with a handle 25. As shown in FIG. 4, the handle 25 is movably coupled on to the lever 22 in the longitudinal direction thereof (in the lateral direction of the drawing), and urged by a spring 26 rightward. Additionally, the handle 25 is provided at the right end thereof with a slant tooth form portion 25a engaging with a slant tooth form portion 5b. Consequently, when the handle 25 is operated to turn the lever 22 about the pin 23 counter-clockwise, the lever 22 can be easily turned. However, normally the tooth form portions 25a and 5b are engaged each other to prevent the lever 22 from turning clockwise. In FIG. 2, the manual locking lever is omitted in order to show the other components clearly. The microswitch 19 is so positioned as to be actuated by the cam portion 15b of the pivotal member 15 to close when the accelerator pedal is depressed beyond a predetermined extent.

Figure 5:
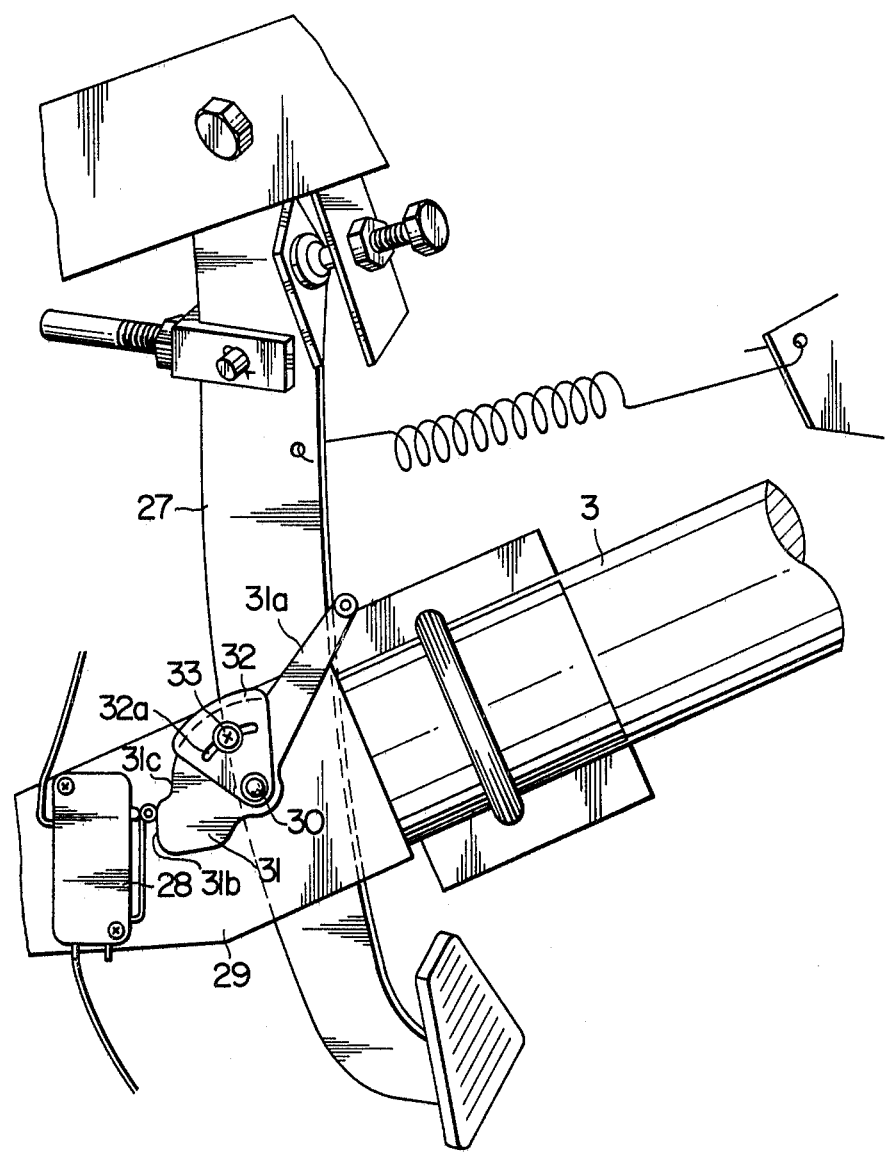
FIG. 5 is a perspective view of a clutch pedal and its associated switch.
Figure 6:
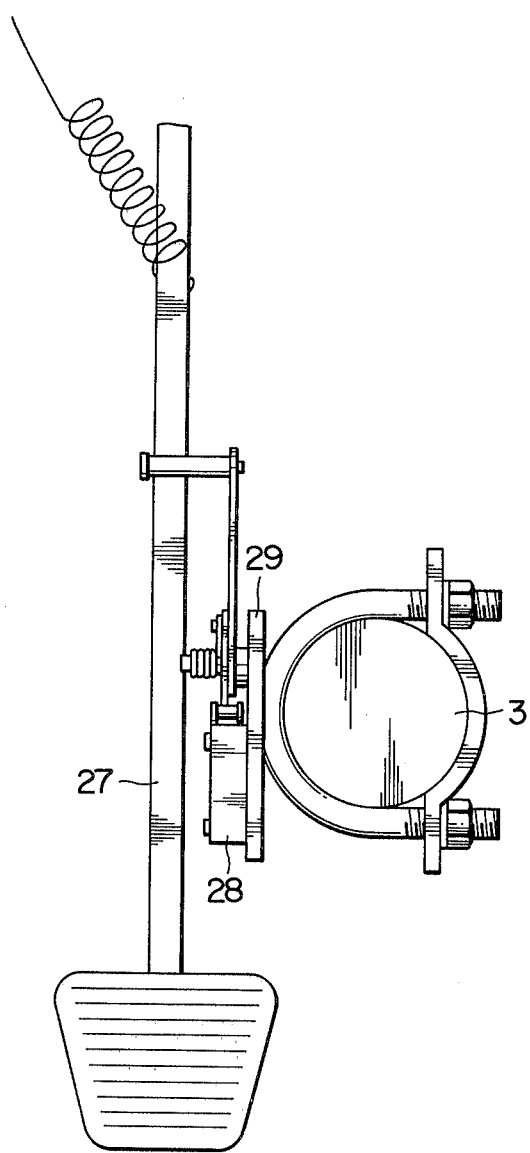
FIG. 6 is a front view of the portion shown in FIG. 5.

In FIG. 5 and FIG. 6, 27 is a clutch pedal, and a microswitch 28 is fastened on a mounting fitting 29. Rotatably coupled to a pin 30 erected on the mounting fitting 29 is a cam 31 having an arm portion 31a. The arm portion 31a supports a roller which engages with the clutch pedal. An adjusting cam 32 is mounted on a surface of the cam 31 by means of a screw 33. The adjusting cam 32 has a hole for receiving the pin 30 and an arcuate slot 32a to be coupled to the screw 33 so that the adjusting cam 32 can be turned about the pin 30 angularly to a certain degree by loosening the screw 33. The cam 31 has cam surfaces 31b and 31c being adapted to engage with an actuater of the microswitch 28, and the height of the cam surface 31b is determined to be flush with the height of the cam surface of the adjusting cam 32. Consequently, the cam surface 31b is arranged such that the cam surface 31b engages the actuater of the microswitch 28 at the position shown in FIG. 5 to keep the microswitch 28 closed, when the clutch pedal is slightly depressed, then the cam surface 31c engages the microswitch 28 to cause the microswitch 28 to open, and when the clutch pedal is further depressed, then the cam surface of the adjusting cam 32 is actuated to cause the microswitch to close again.

Figure 7:
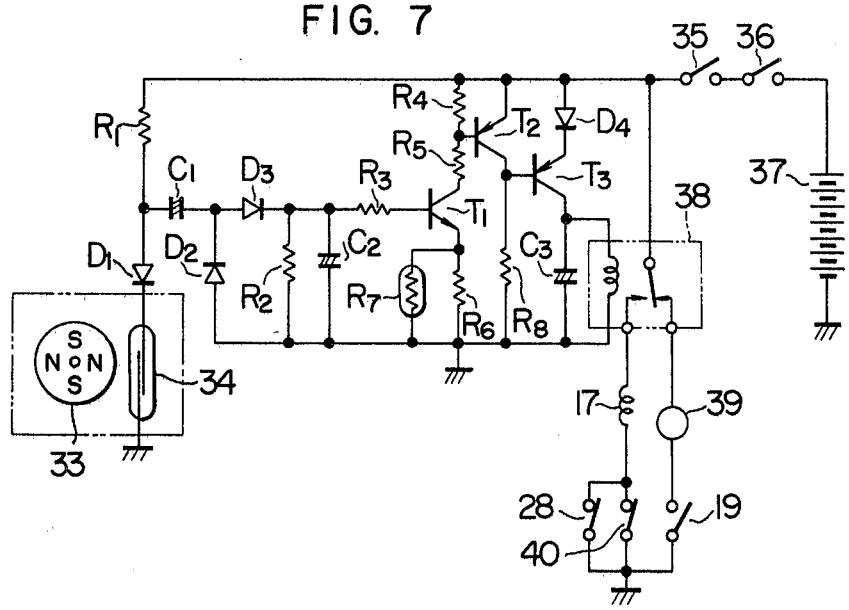
FIG. 7 is an electric circuit diagram of the embodiment.

In FIG. 7, 33 is a permanent magnet associated with a propeller shaft of an automobile so as to rotate therewith, 34 a reed switch disposed adjacent to the permanent magnet 33. The reed switch is connected at one end thereof to the anode by way of a diode $D_1$, a resistor $R_1$, a main switch 35 and a key switch 36, and at the other end to grounding. In addition, the cathode of a power source 37 is also grounded. 38 is a relay, 39 a buzzer, and 40 a switch operationally associated with an accelerator pedal and of such an arrangement that the contact is opened when the accelerator pedal is depressed.

Now assume that the vehicle is running. The permanent magnet 33 is rotated to intermittently interrupt the reed switch 34. Hence, such a process is repeated that, when the reed switch 34 is opened, then a capacitor $C_1$ is charged through a resistor $R_1$ and a diode $D_3$, and, when the reed switch 34 is closed, then electric charge of the capacitor $C_1$ is discharged through the reed switch 34, the diodes $D_1$ and $D_2$. Thus, an a.c. portion of a speed signal generated at the terminal of the capacitor $C_1$ is regulated by a diode $D_3$, smoothed by a smoothing circuit consisting of a resistor $R_2$, and a capacitor $C_2$, and applied to a base terminal of a transistor $T_1$ to which a base resistor $R_3$ and emitter resistors $R_6$ and $R_7$ are connected. Consequently, during running of the vehicle, a base current is passed through the transistor $T_1$ which remains on, and further a base current is also passed through a transistor $T_2$ of a next stage by way of collector resistors $R_4$ and $R_5$ and the transistor $T_2$ remains on. When the transistor $T_2$ is switched fully on, then the voltage applied to a resistor $R_8$ is increased, and accordingly a transistor $T_3$ of the final stage is switched off. In other words, the transistor $T_3$ acts as a phase inverting amplifier. $D_4$ is a diode for biasing, and $C_3$ a capacitor connected in parallel to a coil of a relay 38. Inserted into a collector circuit of the transistor $T_3$ of the final stage is the coil of the relay 38, and transfer contacts of the relay 38 are connected at a common contact thereof to the positive terminal of the power source 37 through the switches 35 and 36, at a constantly opening contact thereof to the electromagnet 17, and at a constantly closing contact thereof to a buzzer 39. Consequently, the electromagnet 17 is not excited during running of the vehicle, since the transistor $T_3$ remains off.

Now, if the brake pedal is depressed, the brake is actuated to decelerate the speed of the vehicle to a stop. Movement of the brake pedal is transferred to the lever 16 through the rod 10, pivotal member 12 and pivotal member 15, so that lever 16 is pivotally moved about the shaft 14. Since the vehicle is running, the electromagnet 17 is not yet energized, so that the electromagnet 17 can easily be moved along the surface of the attracting plate 5. At this time, if the brake pedal is depressed less than a certain extent, then the switch 19 remains unactuated so as not to sound the buzzer 39. If the brake pedal is depressed beyond a certain extent, then the switch 19 is closed to sound the buzzer 39, thereby letting the driver know that the brake pedal is reliably depressed. When the vehicle is stopped, intermittent interruption of the reed switch is discontinued. As a result, the transistor $T_3$ of the final stage is switched on, the relay 38 is actuated, and the transfer contacts are changed over from the position shown in the drawing. In the transfer contacts, the circuit is arranged so that the actuating timing slightly lags behind the moment of stop of the vehicle. More specifically, the circuit including the capacitor $C_2$ is set such that, upon the stop of vehicle, electric charge of the capacitor $C_2$ is discharged through the base of the transistor $T_1$, thereby allowing the transistor $T_1$ to be switched on for about 2 seconds on end. For this, the relay 38 is changed over about 2 seconds after the stop of vehicle so as to excite and actuate the electromagnet 17. Consequently, if the brake pedal is depressed beyond a certain extent, then the switch 19 is closed to keep sounding the buzzer 39 until about 2 seconds elapse after the stop of vehicle, thereafter the electromagnet 17 is actuated and attracted to the attracting plate 5, so that the lever 16 is prevented from pivotal movement about the shaft 14. Since the lever 16 is interconnected to the brake pedal, so that they move together, the brake pedal is locked by the lever 16 which has been locked by the electromagnet 17, and hence, even if the driver's foot is removed from the brake pedal, the brake pedal still maintains the depressed position, thus leaving the brake applied.

Next, when the clutch pedal is fully depressed to start the vehicle, the brake is still retained because the switch 28 is in closed condition. After the actuation of the shift lever, the accelerator pedal is depressed to open the switch 40. Following that, if the clutch pedal is gradually restored while the accelerator pedal is further depressed, then the switch 28 is opened, the excitation of the electromagnet 17 is interrupted, the attracting force of the electromagnet is lost, and the brake is released. At this time, it is possible to facilitate the operation for starting on a sloping road by correlating the amount of the clutch pedal depression with the operating position of the switch 28 so that the timing of beginning of meeting of the clutch disks can be coincide with the timing of opening of the switch 28.

Figure 8:
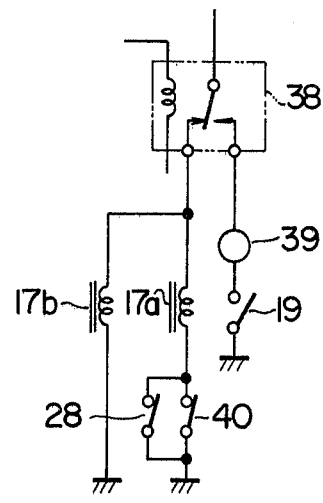
FIG. 8 and FIG. 9 are still other embodiments of electric circuits showing only portions different from that shown in FIG. 7.

In the embodiment shown in FIG. 8, the coil portion of the electromagnet 17 is divided into two coils 17a and 17b, one of which is connected to the switches 28 and 40. In the case that the electromagnet 17 has only one coil as shown in FIG. 7, there is seen such a shortcoming that, when the excitation of the electromagnet is interrupted, then the attracting force of the electromagnet is entirely lost, the brake pedal is abruptly restored, and unpleasant impulsive sound occurs. However, as shown in FIG. 8, in the case that the electromagnet has two coils and the connection is made as shown, if the clutch pedal is fully depressed to start the vehicle at the time that the brake is retained and the vehicle is stopped and thereafter the depression of the clutch is lessened while the accelerator pedal is gradually depressed, then, firstly, only the excitation of the coil 17a is interrupted, the excitation of the electromagnet 17 is decreased and consequently the attracting force thereof is reduced, the electromagnet slides on the attracting plate until the attracting force thereof is balanced with the reaction force against the depression of the brake pedal, with the result that the condition of slightly applied braking is maintained. When the accelerator pedal is further depressed to start the vehicle, then the reed switch 34 is intermittently interrupted, the transistor T₃ of the final stage is switched off, the relay 38 is restored, the excitation of the coil 17b is interrupted, and the brake pedal is entirely released. In this case, attracting force of the electromagnet 17 is reduced by two stages, and hence the brake pedal is slowly restored, thus preventing the unpleasant noise caused by the brake pedal striking against a stopper and the like. Alternatively, if two electromagnets are used instead of that two coils are formed on the electromagnet 17 and the coils of the respective electromagnets are connected as the coils 17a and 17b shown in FIG. 8, then the same result is obtainable. In short, since the connection between the switches 28 and 40 should be arranged such that the excitation of an electromagnet or electromagnets can be reduced by stages, there are various connections adoptable.

Figure 9:
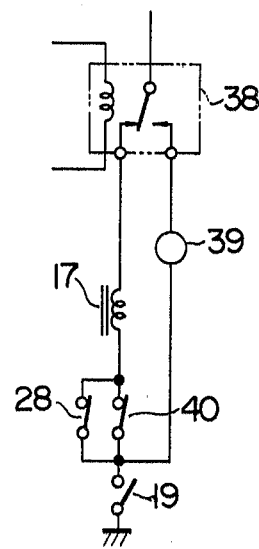

FIG. 9 illustrates an embodiment wherein the connecting position of the brake switch 19 is changed. The respective ends of the buzzer 39, switches 28 and 40 are commonly connected, and grounded through the brake switch 19. According to this circuit arrangement, the electromagnet 17 is not actuated unless the brake pedal is once fully depressed (beyond a certain extent). Hence, when it is desired to apply braking before the starting of vehicle, i.e., during the stop of vehicle, then the pedal can be lightly and easily depressed.

Dimensions of every portions of the pivotal members 12, 15 and the metal arm 16 are determined so as to enlarge the movement of the brake pedal 1 which is transmitted through the fork-like connecting member 9. More specifically, in the case where the distance from the shaft 11 to the pin 13 is A, the distance from the shaft 11 to the pitch circle of teeth 12a is B, the distance from the shaft 14 to the pitch circle of teeth 15a is C and the distance from the shaft 14 to the electromagnet, i.e., the length of the metallic arm 16 is D, the dimensions are determined to satisfy the following formulae.

$$D \cdot B > A \cdot C \text{ or } D > A, B > C$$

By this arrangement, it is possible to fully retain the brake pedal with a relatively small electromagnet, overcoming the reaction force of the brake pedal normally amounting to 20 to 30 kg.

In the manual locking mechanism shown in FIG. 1 and FIG. 3, when the handle 25 is pulled toward the front of the drawing at the time that the brake pedal is depressed and retained by the electromagnet 17, then the catch claw 24 engages with one of the teeth 12a to mechanically lock the pivotal member 12. Consequently, the manual locking mechanism is usable for retaining the brake to be effective even when the power source is switched off.

Additionally, in order to release the mechanical locking, the handle 25 should be pulled overcoming the force of the spring 26 to the left in the drawing.

According to the present invention, the retention of the brake is released only when the clutch disks are in half engaged condition and the accelerator pedal is depressed, thereby enabling eliminate the accidents caused by simple mistaken operations.

What is claimed is:

1. A control device for a braking system of a vehicle comprising:
    means for retaining a brake in braking condition and electrical control means for said retaining means, said electrical control means including
    means for energizing said retaining means upon stopping of the vehicle,
    first switch means adapted to be actuated when an accelerator pedal is depressed beyond a predetermined extent,
    second switch means adapted to be actuated when a clutch pedal is depressed to a predetermined position, and
    circuit means for deenergizing said retaining means when both of said first and second switch means are actuated,
    wherein said retaining means comprises ferromagnetic plate means provided stationarily, lever means pivotally mounted on said plate means and operationally connected to said brake pedal so that said lever means rotates in accordance with the movement of said brake pedal, and electromagnetic means mounted on said lever means so as to face said plate means so that when energized, said electromagnetic means is fixed on the plate means by magnetic attractive force.

2. A control device as set forth in claim 1, wherein an electric coil of said electromagnetic means is connected in series to circuit means including said first and second switch means in parallel.

3. A control device as set forth in claim 2, wherein said second switch means is actuated at a predetermined position intermediate opposite ends of travelling stroke of said clutch pedal.

4. A control device as set forth in claim 1, wherein said means for energizing said retaining means comprises a relay connected in series to an electric coil of said electromagnetic means and relay control circuit means which is adapted to retain said relay at the position "open" during running of the vehicle and to close said relay at a predetermined time after the stop of vehicle.

5. A control device as set forth in claim 4, wherein said electromagnetic means has two electric coils in parallel and one of said coils is connected in series to circuit means including said first and second switch means in parallel.

6. A control device as set forth in claim 2, wherein said electrical control means further comprises third switch means associated to said brake pedal to be actuated when the brake pedal is depressed beyond a predetermined extent, said third switch means being connected in series to an electric coil of said electromagnetic means.

* * * * *